United States Patent [19]

Ronci et al.

[11] 4,063,102
[45] Dec. 13, 1977

[54] CASSETTE

[76] Inventors: Mary Rachel Ronci, 15 Cartier St.; Robert Bray Heaton, 18 Cartier St., both of Cranston, R.I. 02910

[21] Appl. No.: 637,174

[22] Filed: Dec. 3, 1975

[51] Int. Cl.² .............................................. G03B 11/00
[52] U.S. Cl. ..................................... 250/482; 250/480
[58] Field of Search ................ 250/475, 480, 481, 482

[56] References Cited
U.S. PATENT DOCUMENTS

| 1,909,312 | 5/1933 | Page | 250/481 |
| 2,340,378 | 2/1944 | Grobe | 250/481 |
| 2,590,891 | 4/1952 | Reuter | 250/480 |
| 2,590,892 | 4/1952 | Reuter | 250/480 |
| 3,511,990 | 5/1970 | Hauss | 250/480 |
| 3,928,770 | 12/1975 | Turner | 250/482 |

Primary Examiner—Bruce C. Anderson
Attorney, Agent, or Firm—William Frederick Werner

[57] ABSTRACT

This invention relates to an X-ray film holder and more particularly to a cassette for holding low dosage, soft tissue, X-ray film, for use in association with a mammography machine.

3 Claims, 8 Drawing Figures

U.S. Patent     Dec. 13, 1977     4,063,102
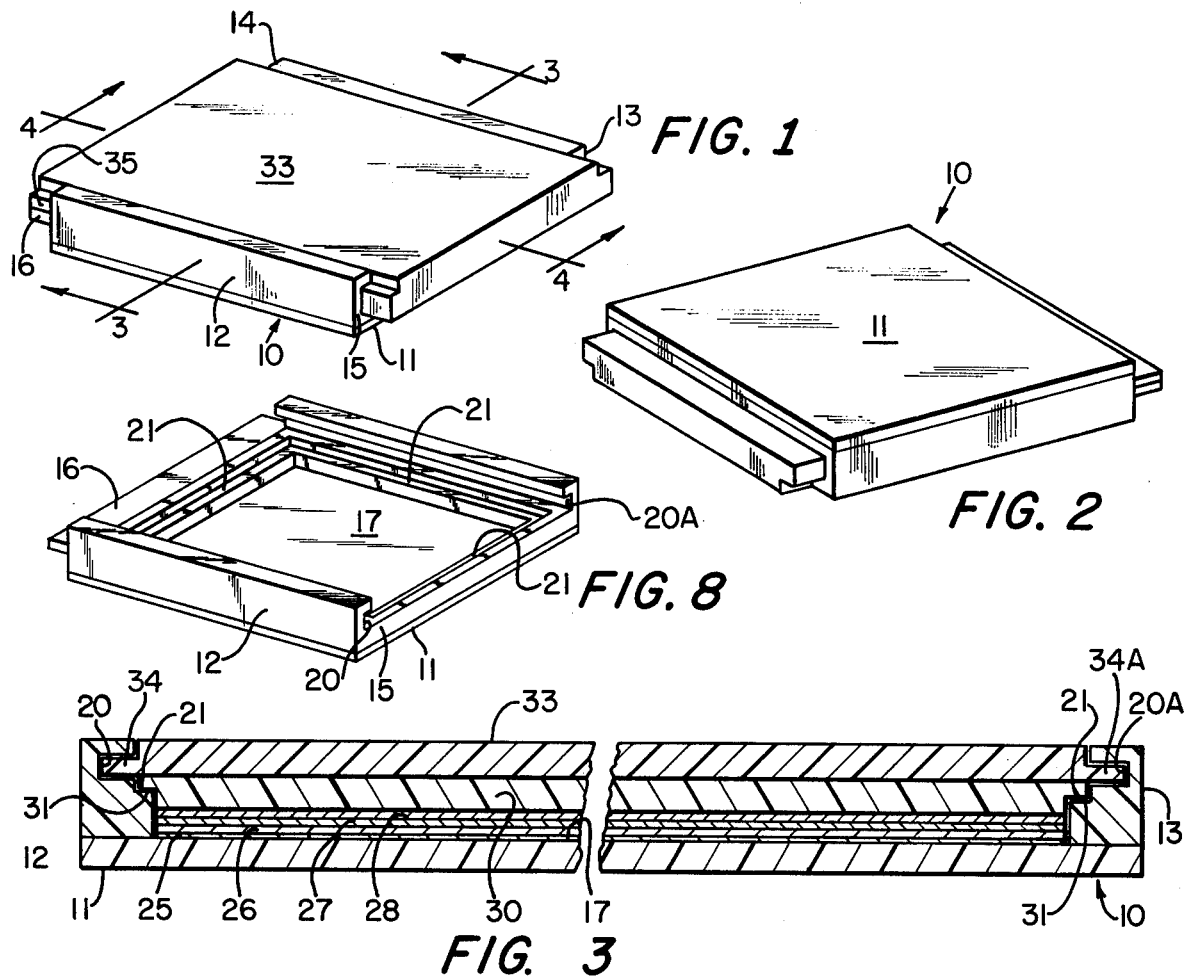
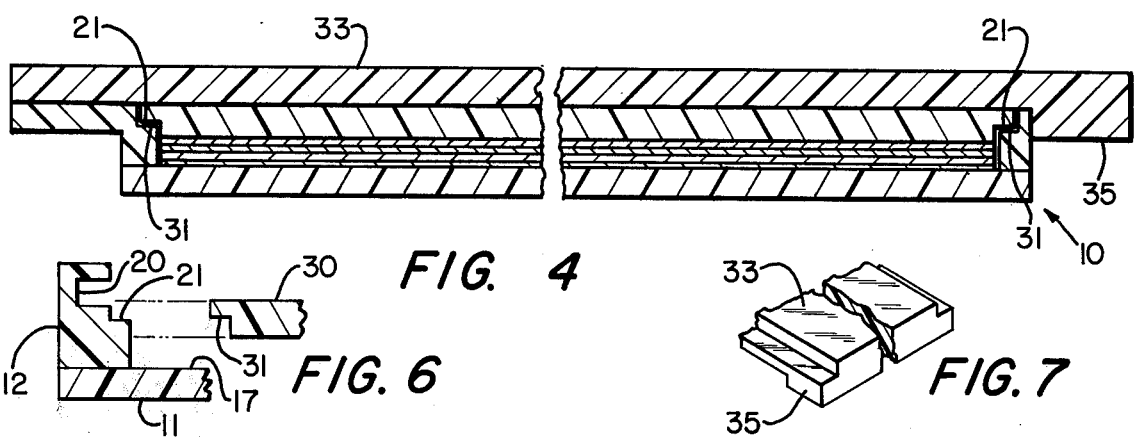
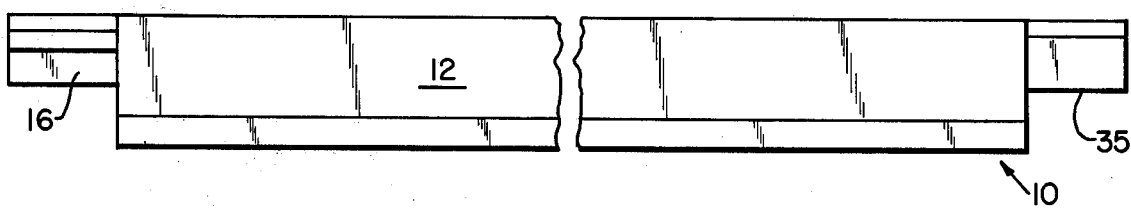

4,063,102

CASSETTE

STATEMENT OF INVENTION

This invention relates to a cassette for holding X-ray film in position against the chest wall and under a mammory gland in a manner to permit the filming through the entire gland uniformly.

BACKGROUND OF THE INVENTION

X-raying the female breast for tumors presents problems due to the various sizes, shapes and thicknesses of the gland. In the past a soft vinyl, flexible pouch provided with an air valve housed the X-ray film. After the film was inserted into the pouch, the pouch was vacuumized to extract all air and thereby prevent air pockets. The pouch was then placed under the mammory gland. The pouch assumed the contour of the gland. A mammory machine exposed the film after the X-rays passed through the gland. It was discovered that small tumors located in various areas of the mammory gland remained undetected by the X-rays. It was the positioning of the breast upon the soft cassette that misaligned the breast in relation to the X-ray machine which allowed small tumors to go undetected.

OBJECTS OF THE INVENTION

Accordingly, it is an object of the present invention to provide a cassette, for holding X-ray film in service, which will firmly support a mammory gland in a manner to uniformly distribute the flesh over the film area while presenting the film to the flesh as close as possible, as is required by low dosage, soft tissue X-raying technique.

Another object of the invention is to provide a cassette which will permit the entire X-ray film including the marginal areas to exposure without distortion or "black-out" caused by the cassette along the marginal areas and to present the cassette to the chest wall for filming as close as possible to the chest wall under the breast.

Other objects of the present invention will be pointed out in part and become apparent in part in the following specification and claims.

BRIEF DESCRIPTION OF THE DRAWINGS

Referring to the drawings in which similar characters of reference indicate corresponding parts in all the figures:

FIG. 1 is a perspective view of the new and improved cassette, showing the top slide;

FIG. 2 is a perspective view similar to FIG. 1, showing the X-ray transparent, relatively rigid base;

FIG. 3 is a vertical cross sectional view, taken on line 3—3 of FIG. 1;

FIG. 4 is a vertical cross sectional view, taken on line 4—4 of FIG. 1; and

FIG. 5 is a left side elevational view of FIG. 1;

FIG. 6 is a fragmentary cross sectional view, showing a detail of construction;

FIG. 7 is a fragmentary perspective view of the top slide, showing a detail of construction;

FIG. 8 is a perspective view of the frame, showing details of construction.

DESCRIPTION OF THE PREFERRED EMBODIMENT

In proceeding with this invention, reference is made to the drawing, wherein is illustrated the new and improved cassette.

The cassette consists of a frame, generally indicated by reference numeral 10, comprising a base 11, a left side 12, a right side 13, a rear end 14 and a front end 15. A wing 16 is attached to or integrally formed to rear end 14. A chamber 17 is formed within sides 12, 13 and ends 14, 15 and above base 11. A groove 20 and a platform 21 are provided in left side 12. An oppositely located groove 20A and platform 21 are provided in right side 13. The platform 21 is also provided in rear end 14 and front end 15.

Base 11 is fabricated from relatively rigid material, radiating ambient temperature to human touch and having X-ray transparent qualities. Base 11 has a smooth uninterrupted surface.

A sheet of static electricity repellant or insulating material such as paper 25 placed in chamber 17 against base 11 and approximates the space between sides 12, 13 and ends 14, 15.

A screen 27 which prevents the penetration of X-rays therethrough and which is as large as the sheet of X-ray film 26 is placed in chamber 17 against film 26.

A second sheet of static electricity repellant or insulating and resilient cushion material 28 is placed in chamber 17 against screen 27 and approximates the size of screen 27.

A pressure pad 30 conforming to the shape of chamber 17, illustrated as being rectangular is provided on four sides with a shoulder 31 which engages platform 21 on all four sides of frame 10.

A top slide 33 provided with tongues 34 and 34A on opposite parallel sides which slidably engage grooves 20, 20A, respectively, in light tight seal relationship. Top slide 33 is also provided with a projection 35 along one edge.

OPERATION

In operation, frame 10 is presented as a holder with an empty chamber 17, for low dosage, soft tissue sensitive, X-ray film. When frame 10 is fabricated from plastic material which radiates ambient temperature, the handling of frame 10 creates static electricity which, first can interfere with the subsequent handling of the film, and secondly, influence dust particles in the atmosphere surrounding chamber 17 so as to reduce the efficiency of the film. Base 11 is substantially transparent to the rays to which the film enclosed in frame 10 is sensitive. If the frame 10 is fabricated from wood, the static electricity problem does not arise.

Placing sheet 25 in chamber 17 against base 11 provides a static electricity repellant and insulator against the plastic base 11. Sheet 25 also provides a compressible cushion.

Sheet 26 of X-ray film is placed against sheet 25. An X-ray screen or grid 27 is placed in chamber 17 against film 26. A second sheet of static electricity insulator and repellant and cushion 28 is placed in chamber 17 against X-ray screen 27.

Pressure pad 30 is placed upon second sheet cushion 28 with shoulder 31 engaging platform 21. Top slide 33 is slid into position to provide a cover for chamber 17 by means of tongues 34, 34A engaging grooves 20, 20A, respectively.

In this manner, the tongue 34 and groove 20 construction provides means to releasably secure the top slide 33 to frame 10 with a light tight seal. Wing 16 and projection 35 provide means for the manual engaging and disengaging of top slide 33 with frame 10.

Cover 33 compresses pressure pad 30 to thereby squeeze air out of chamber 17 and insure that sheet 25, X-ray film 26, screen 27, and second sheet 28 are a compact mass rigidly held in flat position.

Frame 10 is placed in a mammory graph machine so that a mammory gland can be placed and more evenly distributed against base 11 without folds in the soft tissue of the gland.

A low dosage X-ray is passed through the soft tissue, base 11, sheet 25, film 26 and against screen 27 where the X-rays rebound through the film 26 to create a picture thereon.

It will be observed that the present construction presents the X-ray film a desired minimal distance from the surface to be X-rayed. The minimal distance being the thickness of base 11 and the thickness of the sheet of static electricity insulating material paper 25.

The cassette 10 provides a means for holding flexible sheet material in flat condition under uniform resilient pressure to permit use of the marginal edges of the X-ray film and with the film in close approximation to the base having X-ray transparent qualities.

Having shown and described a preferred embodiment of the present invention, by way of example, it should be realized that structural changes could be made and other examples given without departing from either the spirit or scope of this invention.

What I claim is:

1. A cassette for sensitive sheet material comprising a frame having a ray transparent base of relatively rigid material having an ambient surface temperature and provided with an uninterrupted surface, four sides provided on said base and forming a chamber, a sheet of static electricity insulating material in said chamber against said base, a sheet of X-ray film in said chamber against said sheet of static electricity insulating material, an X-ray screen in said chamber against said X-ray film, a sheet of static electricity repellant material in said chamber against said X-ray screen, a pressure pad in said chamber against said sheet of static electricity repellant material, and a top slide, means to releasably secure said top slide in said frame in position covering said pressure pad in light tight seal condition and yieldingly urging said pressure pad towards said base, and means on one end of said top slide and a second means on said frame opposite to said means on said top slide to aid in manually engaging and disengaging said top slide from said frame.

2. A cassette for sensitive sheet material comprising a frame having a ray transparent base, a left side, a right side, a rear end and a front end, a wing integrally attached to said rear end, a chamber provided within said left side, right side, rear end, front end, and above said base, a groove provided in said left side, a second groove provided in said right side, a platform provided in said left side, right side, rear end and front end, a pressure pad having a shoulder along the marginal edges to engage said platform, and a top slide provided with tongues on opposite parallel sides to slidably engage said groove in said left side and right side, respectively, to provide a light-tight sealing lip, and a projection to permit manual removal of said top slide from said grooves in cooperation with said wing.

3. In the manufacture of a cassette for low dosage, soft tissue, sensitive X-ray film, the method comprising the steps of:

a. selecting a frame having an X-ray transparent base of relatively rigid material, radiating ambient temperature to human touch, b. providing a left side, a right side, a rear end and a front end on said base to form a chamber over said base, c. attaching a wing to said rear end, d. providing a groove in said left side, e. providing a second groove in said right side parallel to said groove in said left side, f. providing a platform in said left side, right side, rear end and front end, g. inserting a sheet of static electricity insulating material in said chamber against said base, h. inserting an X-ray film in said chamber against said sheet of static electricity insulating material, i. inserting an X-ray screen in said chamber against said X-ray film, j. inserting a sheet of static electricity repellant material in said chamber against said X-ray screen, k. providing a pressure pad having a shoulder adapted to engage said platform in said left side, right side, rear end and front end, l. providing a top slide, having tongues on opposite parallel sides adapted to overlie said pressure pad and compressing said pressure pad and slidably engage said groove in said left side and said groove in said right side, to provide a light-tight seal over said chamber, and m. providing a projection on said top slide, to permit manual inserting and removal of said top slide from said grooves in cooperation with said wing.

* * * * *